Dec. 26, 1944.  F. G. BOUCHER  2,365,999
BORE HOLE INCLINOMETER
Filed Dec. 18, 1942

Frank G. Boucher. INVENTOR.
BY J. D. McKean
ATTORNEY.

Patented Dec. 26, 1944

2,365,999

UNITED STATES PATENT OFFICE 2,365,999

BOREHOLE INCLINOMETER

Frank G. Boucher, Tulsa, Okla., assignor to Standard Oil Development Company, a corporation of Delaware Application December 18, 1942, Serial No. 469,499

2 Claims. (Cl. 33—205)

The present invention is directed to an inclinometer particularly suitable for bore hole operations.

When conducting operations in bore holes or at other places inaccessible to the operator, it is frequently desirable to determine the inclination of a tool or device. Means for indicating inclination are at present known to the art, but they have usually been found unsatisfactory either because they are incapable of giving a record or because they are unduly complicated.

It is an object of the present invention to produce an improved inclinometer.

More particularly it is an object of the present invention to devise a cable suspended tool which will give to an operator at the surface of the earth a continuous indication of the inclination of a tool in a bore hole.

Other objects and advantages of the present invention may be seen from reading the following description taken with the drawing in which Figure 1 is an elevation partly in section of a preferred embodiment of the present invention.

Figure 1:
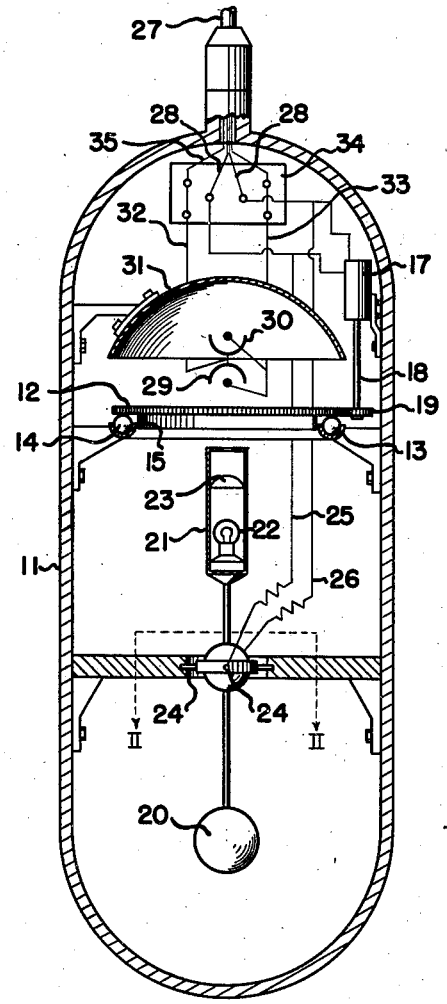

Mounted within a casing or bomb 11 suitable for lowering in a bore hole is a circular shutter 12 arranged for rotation in the casing with the plane of the shutter at right angles to the longitudinal axis of the casing. A suitable means for supporting the shutter for rotary motion is ring shaped track 13 secured to the casing 11 at its periphery and provided with ball bearings 14 for supporting the shutter. A downward extending circular ledge 15 secured to the underside of the shutter completes the supporting means. A ring gear 16 is secured to the periphery of the shutter and arranged to rotate the shutter for a motor 17 with its vertically extending shaft 18 provided with a gear 19 arranged to cooperate with the ring gear of the shutter and rotate the shutter at a constant speed.

Mounted in the casing below the shutter is a pendulum mounted for free motion in all directions. Attached to the upper extension of the pendulum is an optical tube 21 in which is arranged a light source such as a globe 22 and a lens 23. The light source lens and optical tube are arranged to produce a beam of light with parallel rays extending along the longitudinal axis of casing 11 when the casing is perpendicular. From the above description it will be apparent that when the casing is perpendicular the beam of light from the optical tube will impinge on the center of shutter 12.

Figure 2:
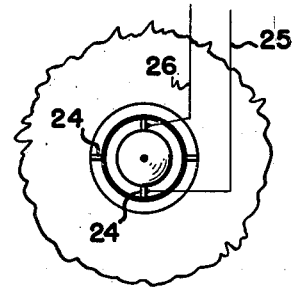
Figure 2 is a view taken along the line II—II of Figure 1.

In the embodiment illustrated in Figures 1 and 2, the pendulum 20 is mounted on gimbals 24 and power for operating lamp 22 is transmitted thereto through the gimbal ring by means of conductors 25 and commutators 26 as appears in the drawing. A cable 27 is arranged suspending the device and power is transmitted down through the cable through conductors 28 for operating both motor 17 and lamp 22.

Mounted in casing 11 in the upper end thereof above shutter 12 is a light sensitive means. A satisfactory arrangement is that shown in the drawing comprising a pair of photocells 29 and 30 with a concave mirror 31 mounted above the photocells. It will be evident that the arrangement of photocells and the mirror is such that any light transmitted from lamp 22 through shutter 12 will be effective to actuate either photocell 29 or photocell 30. The signal received by the pair of photocells 29, 30 is transmitted through conductors 32, 33 to amplifier 34. The amplified signal is then transmitted through insulated conductors 35 contained within the suspending cable to a recording galvanometer, not shown, arranged at the surface of the earth.

Figure 3:
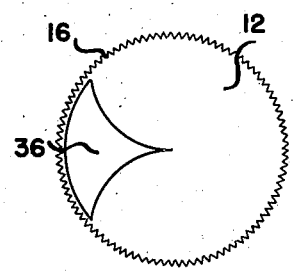
Figure 3 is a top view of the shutter with which the device of Figure 1 is provided.

A top view of a suitable shutter for the device is shown in Figure 3. A portion 36 is removed from the shutter so that when the axis of casing 11 is vertical little or no light will be passed by shutter 12 from source 22 to photocells 29, 30. However, upon deviation of casing 11 from the vertical light will be transmitted from the lamp to the photocells with each rotation of the shutter. The opening 36 in the shutter is so arranged that with increasing displacement of the axis of casing 11 from the vertical end is a progressively increased time of exposure of the photocells to light from the lamp. In other words, when the casing 11 deviates from the vertical a pulse is transmitted by the photocells with each revolution of the shutter, the duration of the pulses being a function of the deviation of the casing from the vertical.

Figure 4:
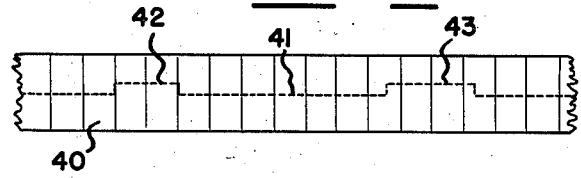
Figure 4 is a view of a typical record which may be obtained by the device.

A portion of a typical record obtained from the device is shown in Figure 4. This figure illustrates a strip of film upon which a record is produced by a beam of light transmitted from a galvanometer connected with the photocell electric cells. Number 40 designates the strip of film and number 41 the record produced by the galvanometer electrically connected to the photo electric cells. As shown in the record, two pulses have been indicated by the galvanometer indicated by the portions 42 and 43 of the curve. In this record 42 is of shorter duration than 43 indicating that the inclination of the device has increased from the point at which 42 was measured to the point at which 43 was indicated.

Figure 5:
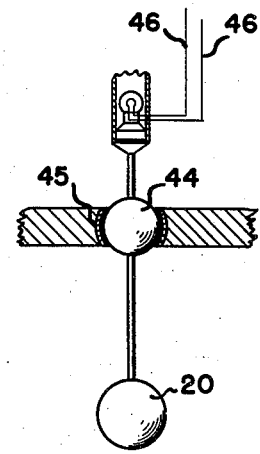
Figure 5 is a fragmentary view illustrating another means of mounting the pendulum of the device.

A modification of the means for suspending the pendulum is illustrated in Figure 5. In this embodiment a ball 44 is attached to the pendulum and a member 45 adapted to be secured to the casing defines a suitable socket to cooperate with the ball. In this embodiment leadwires 46 connect lamp 22 to the source of power. The leadwires are of ample length to allow the pendulum to move freely in all directions. The remainder of the apparatus according to this modification may be the same as in Figure 1 and accordingly is not again illustrated.

It will be obvious that the depth of casing 11 should preferably be indicated simultaneously with its inclination. Suitable devices for indicating the depth of a cable suspended tool are conventional to the art and may, of course, be used to indicate or record the depth of casing 11 while the inclination of the casing is being indicated. Since devices for indicating the depth of a tool are well known to the art such a device has not been illustrated in the drawing. In like manner, suitable galvanometers for recording the output of the photo electric cells are also well known to the art and have not been specifically shown. It will be apparent that any conventional means may be used in conjunction with the embodiments described herein.

Having fully described and illustrated the present invention, what I desire to claim is:

1. A bore hole inclinometer comprising in combination an elongated casing, a pendulum mounted in the lower portion of said casing for movement in all directions, a source of light carried by said pendulum, means arranged for projecting a beam of light from said source along the longitudinal axis of said casing when said casing is perpendicular, a photo electric cell means mounted in the upper portion of said casing, a circular shutter mounted for rotation between said light source and said photo electric cell means having an opening from its center to its periphery progressively larger than a segment of said circle, means arranged to give said shutter constant rotary speed, means arranged to amplify the signal received by the photo electric cell means and to transmit it to a galvanometer.

2. A device in accordance with claim 1 in which the photo electric cell means comprises a pair of photo electric cells mounted back to back in front of a curved mirror and arranged to receive light transmitted through said shutter.

FRANK G. BOUCHER.